United States Patent [19]
Scott et al.

[11] Patent Number: 4,820,972
[45] Date of Patent: Apr. 11, 1989

[54] WALL THICKNESS DETECTOR

[75] Inventors: Paul F. Scott, Hartford; Donald C. Button, Cheshire, both of Conn.; Charles B. Reeves, Salem; Edward D. Howerter, Danvers, both of Mass.

[73] Assignee: Emhart Industries, Inc., Farmington, Conn.

[21] Appl. No.: 69,457

[22] Filed: Jul. 2, 1987

[51] Int. Cl.⁴ .............................................. G01R 27/26
[52] U.S. Cl. ................................. 324/61 P; 324/158 P
[58] Field of Search ............... 324/61 R, 61 P, 61 QS, 324/61 QL, 158 P, 557, 558, 559

[56] References Cited

U.S. PATENT DOCUMENTS

| | | | |
|---|---|---|---|
| 2,573,824 | 11/1951 | Baker | 324/61 R |
| 2,616,068 | 10/1952 | McDonald | 324/61 R |
| 3,393,799 | 7/1968 | Schmersal | 324/61 P |
| 3,684,089 | 8/1972 | McMeekin | 324/61 R X |
| 4,103,226 | 7/1978 | Fromson et al. | 324/61 R X |
| 4,482,860 | 11/1984 | Risko | 324/61 P |

*Primary Examiner*—Reinhard J. Eisenzopf
*Assistant Examiner*—Robert W. Mueller
*Attorney, Agent, or Firm*—Spencer T. Smith

[57] ABSTRACT

A capacitive probe for a wall thickness detector comprises a plurality of flexible capacitive elements and an elastomeric body supporting the flexible capacitive elements and biasing them against a dielectric body at an inspection site. A first metallic shield is supported between the elastomeric body and the capacitive elements and a second metallic shield is supported on the other side of the capacitive elements in close proximity thereto and has a window to expose the capacitive elements to the dielectric member.

5 Claims, 6 Drawing Sheets

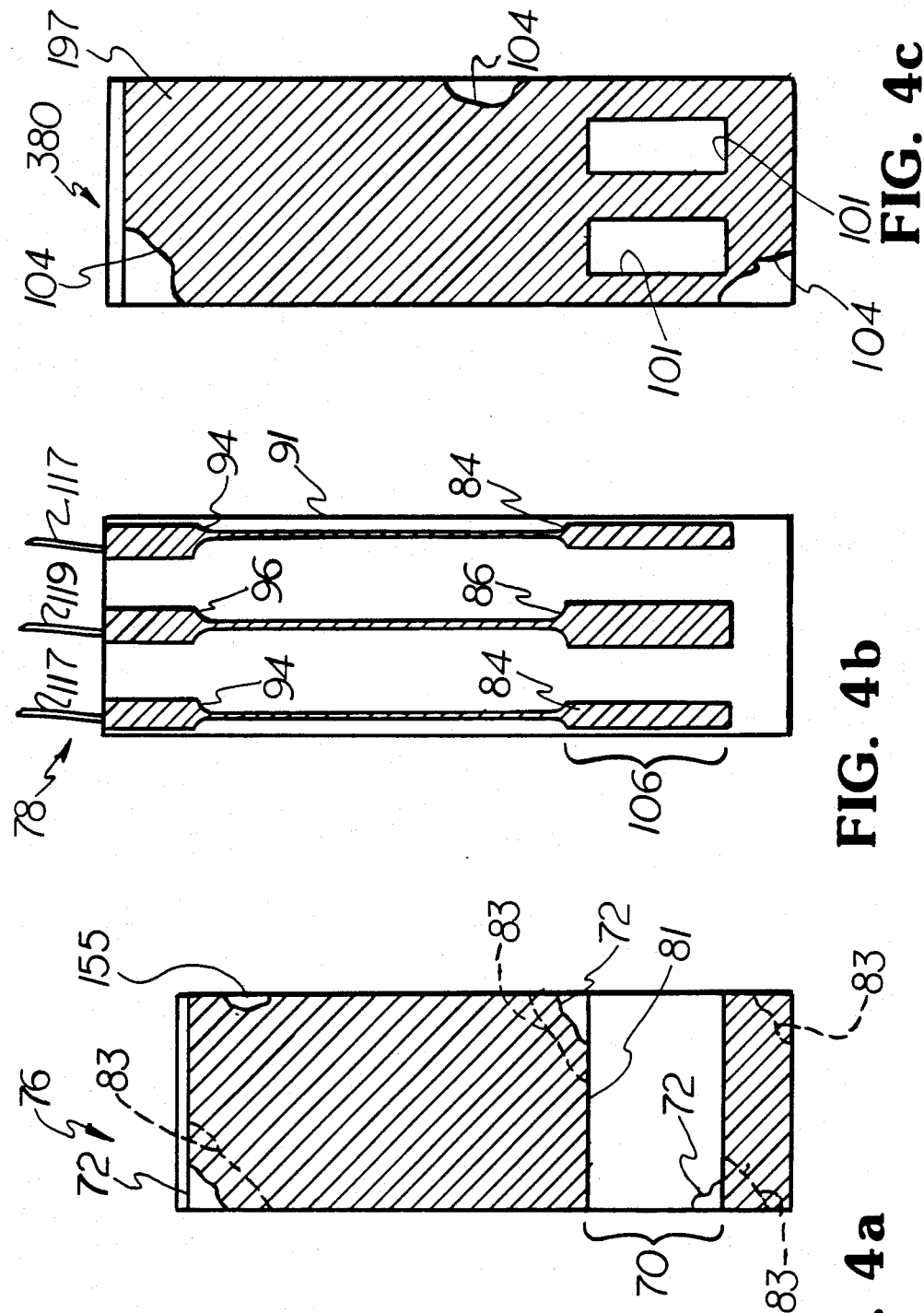

WALL THICKNESS DETECTOR

The invention relates generally to inspection apparatus and deals more particularly with a wall thickness detector for glassware, flat glass and other products.

Wall thickness is an important factor throughout the glass industry because a thin wall region increases the likelihood of breakage. To measure the wall thickness of glass bottles, it was previously known to rotate the glass bottles at an inspection site to expose a circumferential band to a wall thickness probe. Various capacitive probes have been utilized to indirectly measure the wall thickness. For example, U.S. Pat. No. 3,684,089 to McMeekan discloses a capacitive probe comprising a plurality of electrodes made of spring steel which engage sidewalls of a glass container as the container is rotated. The electrodes are part of a bridge and the resultant capacitance exhibited by the electrodes in contact with the glass sidewall indicates the wall thickness.

U.S. Pat. No. 2,285,152 to Firestone discloses a capacitive probe comprising two electrodes which are placed in contact with one surface of a container and the capacitance between them measured.

U.S. Pat. No. 3,629,699 to Voss discloses apparatus for dielectric testing of containers in which an expandable plate is inserted through the mouth of a bottle and positioned adjacent to the bottom. Another plate is raised to the bottom surface of the bottle and the capacitance between the two plates is measured.

U.S. Pat. No. 3,393,799 to Schmersal discloses apparatus for measuring the thickness of dielectric members and includes an antenna which is biased from the outer sidewalls of the container by a contact wheel.

U.S. Pat. No. 2,601,649 to Wadman discloses apparatus for measuring the thickness of dielectric material and includes a single spherical electrode which contacts the container sidewall.

U.S. Pat. No. 2,616,068 to McDonald discloses apparatus for measuring the thickness of dielectric material and includes a single electrode which is resilient pressed into a rotatable engagement with a container by means of compression springs.

U.S. Pat. No. 2,573,824 to Baker discloses apparatus for measuring the thickness of dielectric material and includes a main capacitor plate 71 which is arcuately shaped and supported adjacent to the periphery of a container. Capacitor pick-up plates are also provided exterior to its base slightly from the container.

U.S. Pat. No. 3,708,064 to Schepler discloses apparatus and method for measuring the wall thickness of dielectric materials and includes an RF antenna supported adjacent to but apparently not in contact with the exterior of the container and a coaxial receiver probe which measures the strength of the resultant electromagnetic field.

U.S. Pat. No. 3,710,938 to Scherf discloses an apparatus for detecting wall thickness in which an RF field is established in the vicinity of a glass container and the magnitude of the field as effected by the container is measured to indicate wall thickness.

Previously known systems in which a capacitive probe contacts the bottle have experienced problems in maintaining contact with the bottle sidewall during rotation at high speed because the bottle surfaces are uneven and may have bumps and seams up to 0.040 inches in height. Also, the bottles may be out-of-round by as much as 0.125 inches. In the previously known apparatus, either the capacitive probes are too heavy or the spring biases are not compliant enough to maintain adequate pressure against the glass sidewall. Increases in the spring stiffness to keep the probe in contact with the glass sidewall would result in too much pressure on the bottle causing drag, excess wear on the probe, or damage to the bottle. In other previously known systems where the capacitive probe does not actually contact the bottle, it has proven difficult to maintain a uniform gap between the probe and the bottle and the gap substantially effects the capacitance of the probe.

Accordingly, a general object of the invention is to provide a wall thickness detector which is accurate at a high speed of operation.

Another general object of the present invention is to provide a wall thickness detector which measures the thickness at a defined area.

A more specific object the present invention is to provide wall thickness detectors of the foregoing types which are suitable to measure the thickness of the sidewalls of glass bottles and require ordinary means to rotate the glass bottle during the inspection.

SUMMARY OF THE INVENTION

The invention resides in an inspection apparatus for detecting wall thickness of a dielectric body, the apparatus having a conveyor for transporting a plurality of the dielectric bodies serially to an inspection site and a means for rotating the dielectric bodies at the inspection site. The inspection apparatus includes a capacitive probe having a plurality of flexible capacitive elements and an elastic body supporting the flexible capacitive elements. The capacitive probe is supported such that the elastic body receives each of the dielectric bodies at the inspection site and biases the flexible capacitive elements toward the dielectric body to contour the dielectric body at the inspection site. An electronic means determines wall thickness based on the capacitance provided by the capacitive probe.

According to a first feature of the invention, the elastic body comprises foamed plastic.

According to a second feature of the invention, a first metallic shield is supported between the elastic body and the capacitive elements and a second metallic shield is supported on the other side of the capacitive elements in close proximity thereto and has a window means for exposing the capacitive elements to the dielectric body. One of the capacitive elements and the two shields are driven with a common voltage waveform.

BRIEF DESCRIPTION OF THE FIGURES

FIGS. 4A-4C are plan views of three of the layers of the capacitive circuit board of FIG. 3.

DETAILED DESCRIPTION OF THE PREFERRED EMBODIMENT

Figure 1:
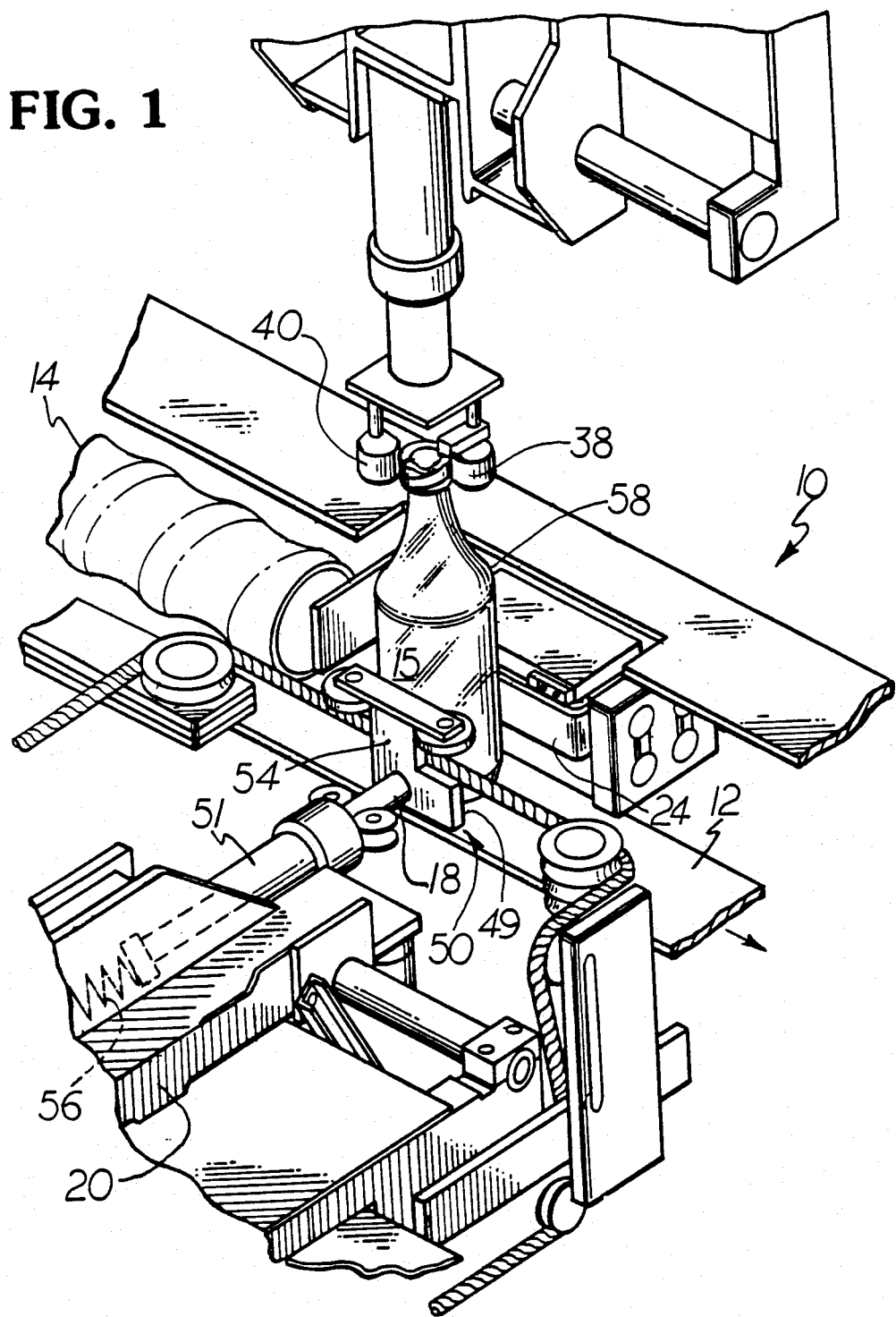
FIG. 1 is a perspective view illustrating an inspection apparatus which includes a wall thickness detector embodying the present invention.

FIG. 1 illustrates a container inspection station generally designated 10 which includes a linear conveyor 12 of conventional design and a feed screw 14 which spaces and sequentially moves containers such as a glass bottle 15 to an inspection site. At the inspection site, the container 15 engages a horizontally moving endless belt 24 which rotates the bottle 15, and a pair of flanged, finish rollers 38 and 40 are lowered against the bottle mouth to hold the bottle down during the rotation. In addition, at the inspection station, the bottle engages a capacitive probe 49 of a thin wall detector 50. The thin wall detector 50 also includes a support 51 and a bracket plate or clamp 54 which support the capacitive probe 49. While the capacitive probe 49 is generally maintained in a stationary position as shown, the detector 50 includes an overdrive spring 56 which allows the capacitive probe 49 to withdraw from contact with an oversized or overturned bottle which inadvertently attempts to pass through the inspection station. For further details of other mechanical features of the inspection apparatus 10, reference may be made to U.S. Pat. No. 3,690,456 to Powers, which patent issued Sept. 12, 1972 and is hereby incorporated by reference as part of the present disclosure.

During the operation of the wall thickness detector 50, the bottle 15 is rotated by the belt 24 so that the capacitive probe 49 engages and thereby senses a circumferential band extending completely around the bottle 15. It should be noted that even though the capacitive probe 49 is illustrated in FIG. 1 as engaging the lower half of the bottle 15 sidewall, the height of the capacitive probe 49 may be adjusted to correspond to a likely thin wall location or, if desired, a plurality of the wall thickness detectors may be utilized to inspect different vertical portions of the bottle. It should also be noted that because of the resiliency of the capacitive probe 49 as described below, it is possible for the probe to inspect a portion of the bottle having a vertical curvature such as at a shoulder portion 58.

Figure 2:
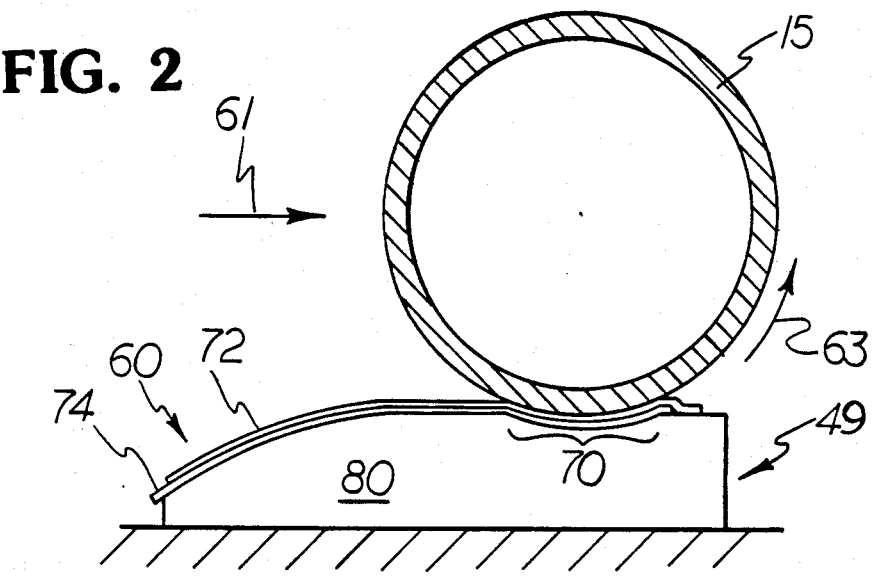
FIG. 2 is top view of a capacitive probe within the wall thickness detector of FIG. 1 in engagement with a bottle illustrated in FIG. 1.

FIG. 2 is a top view of the capacitive probe 49 in engagement with and receipt of the bottle 15. A leading or front edge 60 of the probe 49 is tapered inwardly to allow the bottle 15 to move on the conveyor 12 along it without catching the front edge. The bottle 15 continues to move along the probe 49 linearly in the direction of an arrow 61 until it reaches the inspection site and then is rotated as indicated by an arrow 63. At the inspection site, the wall thickness detector 50 including the probe 49 is transported linearly by a carriage 20 (FIG. 1) in timed relation with the linear motion of the bottle 15 on the conveyor 12. Consequently, the bottle 15 maintains engagement with a capacitive measurement portion 70 of the probe 49 for at least one complete rotation of the bottle 15.

Also, as illustrated in FIG. 2, the capacitive probe 49 includes an outer, low-wear layer 72 which protects the probe 49 which layer may, by way of example, comprise a ultra-high molecular weight polyethylene with a pressure sensitive adhesive on its under surface which bonds it to a flexible capacitive circuit board 74 underneath. Also, by way of example, the protective layer 72 may comprise a polyvinyl flouride material. In addition to protecting the remainder of the capacitive probe 49, the protective layer 72 provides a low resistance to minimize drag on the bottle 15 during its linear translation on the conveyor and rotation relative to the probe 49.

The capacitive probe 49 also includes a resilient support body 80 which, by way of example, may comprise an elastomeric material or any other form of elastic device such as a flexible bladder containing gas or fluid under suitable pressure. Preferably, the support body 80 is made of silicon or neoprene foam. Such an elastomeric material as the foam provides a high stiffness to weight ratio, low inertia, high heat resistance, omnidirectional resilliency and a consistent electrical characteristic over a wide temperature range. The support body 80 provides a multidirectional pressure profile on the capacitive circuit board 74 causing the capacitive circuit board to contour the cylindrical sidewall of the bottle which will insure uniform, close spacing between the capacitive elements and the bottle surface throughout the operating range of the probe.

Figure 3:
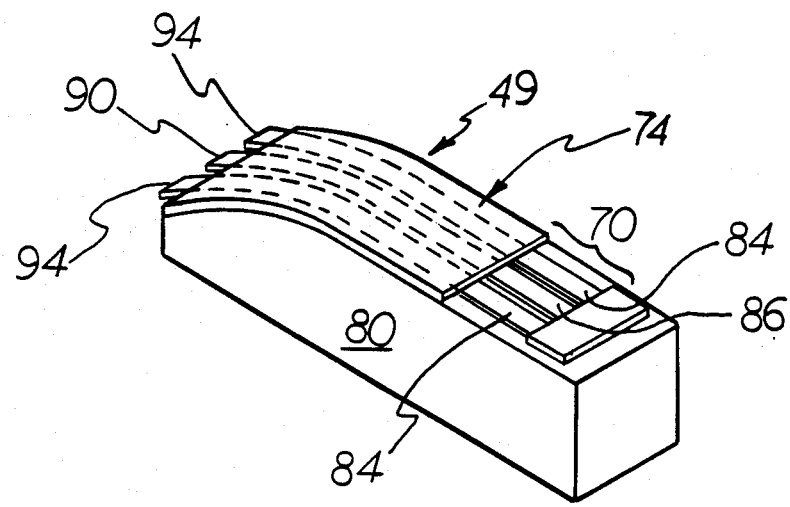
FIG. 3 is a perspective view of the wall thickness detector of FIG. 2 including a flexible capacitive circuit board.

FIGS. 3–4 further illustrate the capacitive probe 49 except that the protective layer 72 is not shown in FIG. 3 to give a clearer view of the flexible capacitive circuit board 74. The circuit board 74 comprises a top layer 76 illustrated in FIG. 4(a), a middle layer 78 illustrated in FIG. 4(b) and a bottom layer 380 illustrated in FIG. 4(c). The top layer 76 is a capacitive shield or guard and, by way of example, is formed from copper foil. The protective layer 72 is bonded to the upper surface of the top layer 76 and covers a window 81 within the top layer 76. By way of example, the foil is 0.001 inches thick. The shield is designed to eliminate variations in capacitance which are not associated with bottle thickness but which will affect the measurement absent the capacitive shield. The shield layer 76 includes the window 81 to expose capacitive elements 84 and 86 discussed below.

FIG. 4(A) also illustrates a Teflon layer 83 bonded to the underside of the layer 76 to insulate the capacitive shield layer 76 from the underlying layer 78. By way of example, the Teflon layer is approximately 0.002 inches thick and utilize an epoxy to bond the teflon to the shield layer 76.

The middle layer 78 includes the capacitive elements 84, 84 and 86 which elements may, for example, comprise copper foil strips bonded to a thin flexible plastic base 91. By way of example, the plastic base 91 comprises polypropylene or Tedlar 0.002 inches thick. The capacitive probes 84, 84 and 86 taper to thin strips of the copper foil and continue over much of the length of the capacitive probe 49 until they terminate in contact pads 94, 94, and 96 respectively which also, by way of example, comprise copper foil. The contact pads 94, 94 and 96 protrude from the end 60 of the capacitive probe 49 to facilitate electrical connection to wires which connect to an electronic processor 100 described below. Alternately, a rigid printed circuit board may be interposed between the capacitive elements and the wires.

Because of the Teflon 83 bonded to the underside of the shield layer 76, the copper foil of the middle layer 78 does not make an electrical contact with the shield layer 76, and because of the window 81, the capacitive elements 84, 84 and 86 are not shielded. As described in more detail below, a non-zero voltage waveform is applied to the capacitive element 86 which generates a field and the capacitive elements 84, 84 are shorted to one another and grounded to receive the field. Because the capacitive elements 84, 84 are situated on opposite sides of the capacitive element 86, the field emanating from the capacitive element 86 is confined to a region approximately bounded by planes through and normal to the capacitive elements 84, 84 which field is also preferably confined to the side of the capacitive probe 49 adjacent to the bottle 15 because of the layer 80 below. Consequently, the field emanates over a defined portion of the bottle sidewall.

The bottom layer 380 also, by way of example, comprises copper foil approximately 0.001 inches thick and serves to shield the capacitive elements 84, 84 and 86 below so that they are not affected by matters occurring on the side of the capacitive probe 49 opposite the bottle 15. Windows 101 are provided in the shield layer 380 to limit the radiation from the shield layer 380 to the capacitive elements 84, 84 because, as described below, the copper foils of the two shield layers are driven with the same voltage waveform as the capacitive element 84.

A Teflon layer 104 is bonded by epoxy to the upper surface of the bottom layer 380 to prevent an electrical connection between the foil of the bottom layer 80 and the foil strips of the middle layer 78. During the rotation and wall thickness inspection of the bottle 15, the unshielded portion 70 of the capacitive probe 49 is included within an arc of contact of the bottle to obtain a reliable measurement. This is accomplished by setting the bottle penetration into the capacitive probe 49 by an amount which produces an arc of contact approximately 20% greater than a length 106 of the window 81.

Figure 5:
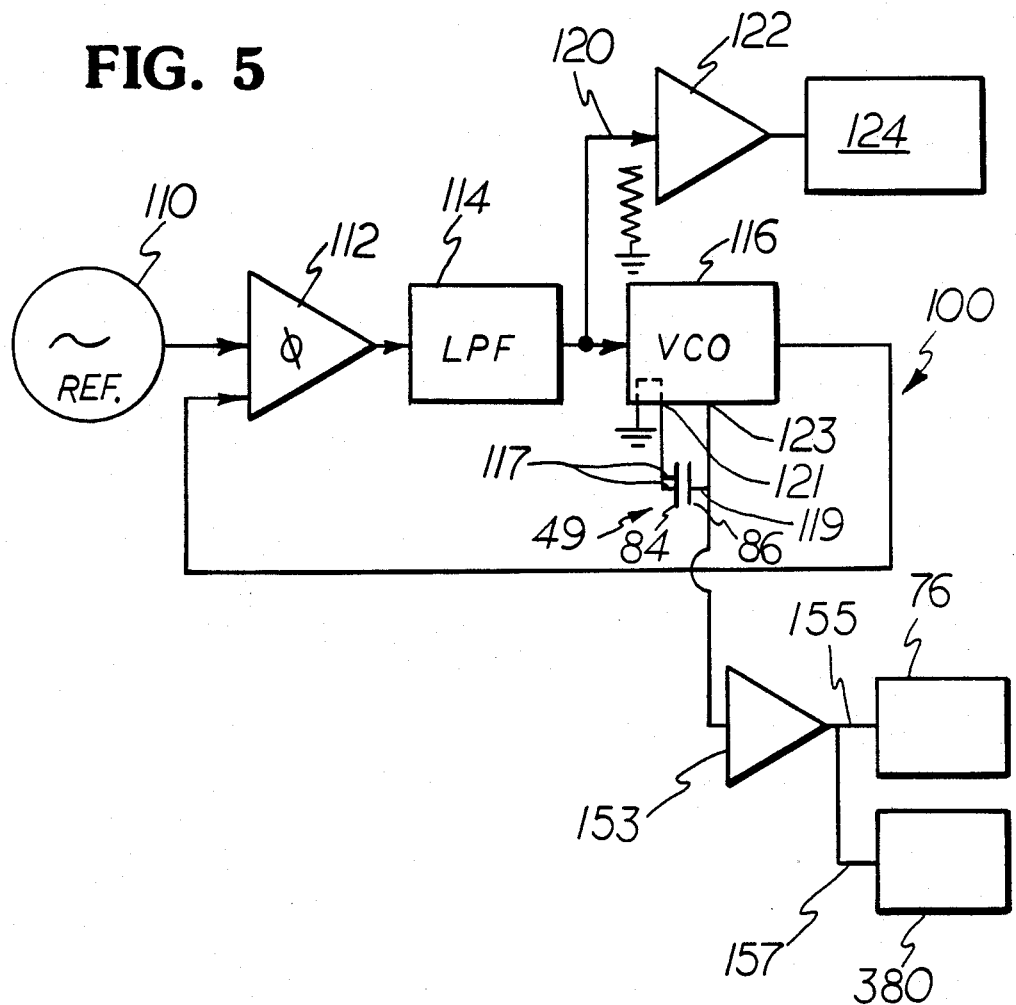
FIG. 5 is a schematic block diagram of an electronic processor within the wall thickness detector of FIG. 1.

The electromagnetic field established between the capacitive elements 84, 84 and 86 corresponds to the thickness and dielectric property of the bottle 15 sidewall so that variations in such thickness affect the capacitance established by the capacitive elements 84, 84 and 86. Such capacitances are utilized in the electronic processor 100 to determine the wall thickness as a function of time during the rotation of the bottle. As illustrated in FIG. 5, the electronic processor 100 includes a reference oscillator 110, which supplies a voltage waveform having a constant frequency to phase detector 112. Another input of the phase detector 112 is supplied by an output of a voltage controlled oscillator 116. The capacitive elements 84, 84 and 86 are connected to control ports 121, 123 of the voltage controlled oscillator 116 by wires 117, 117 and 119 so that the capacitance developed between the capacitive elements 84, 84 and 86 determines the output frequency of the voltage controlled oscillator 116. Via the port 123, the voltage controlled oscillator 116 applies its voltage waveform to the capacitive element 86, and the port 121 provides a ground. The output of the phase detector 112 is a function of the difference in phase between the reference oscillator 110 and the voltage controlled oscillator 116 and is supplied to a low pass filter 114. The output of the low pass filter 114 is proportional to the difference in phase between the voltage controlled oscillator 116 and the reference oscillator 110 and indicates the thickness of the bottle sidewall according to the following equations:

$f_o = G_o/C_o$ where $f_o$ is the frequency of the VCO 116, $G_o$ is a constant and $C_o$ is the probe capacitance including stray capacitance at a standard thickness of the sidewall;

$f_r - f_o = K_o V_o$ where $K_o$ is a constant, $V_o$ is the output of the low pass filter 114, and $f_r$ is the frequency of the reference oscillator 110; and (delta $C$) = $K_o$ (delta V) $C_o^2/(G_o - K_o$ (delta $V$) $C_o)$ where "delta C" is the change in capacitance of the probe due to a change in thickness of the sidewall, and "delta V" is the resultant change in the output 120 to the low pass filter 114.

The output 120 may be supplied to one input of a comparator 122, the other input of the comparator supplied by a reference voltage, and the output of the comparator supplied to a rejector 124 so that if the wall thickness at any portion on the bottle under inspection is less than a predetermined level, the output voltage will be greater than the reference voltage and the rejector 124 will be activated to reject the bottle.

FIG. 5 also illustrates that the voltage controlled oscillator 116 supplies its voltage waveform to the foils of the shield layers 76 and 380 via a buffer 153 and wires 155 and 157 which are soldered to the foils of the shield layers 76 and 80, respectively.

Figure 6:
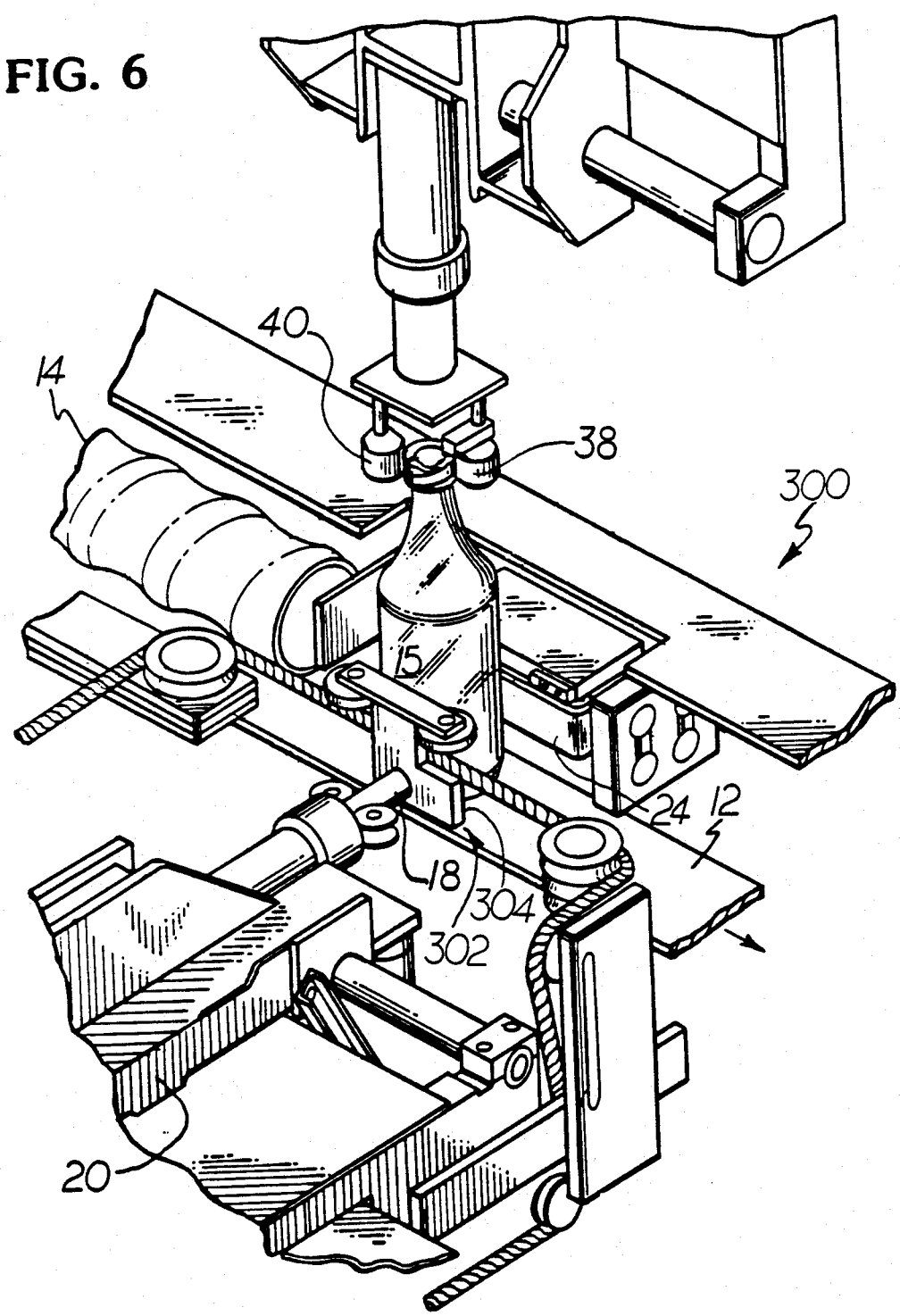
FIG. 6 is a perspective view illustrating another inspection apparatus which includes another wall thickness detector embodying the present invention.
Figure 7:
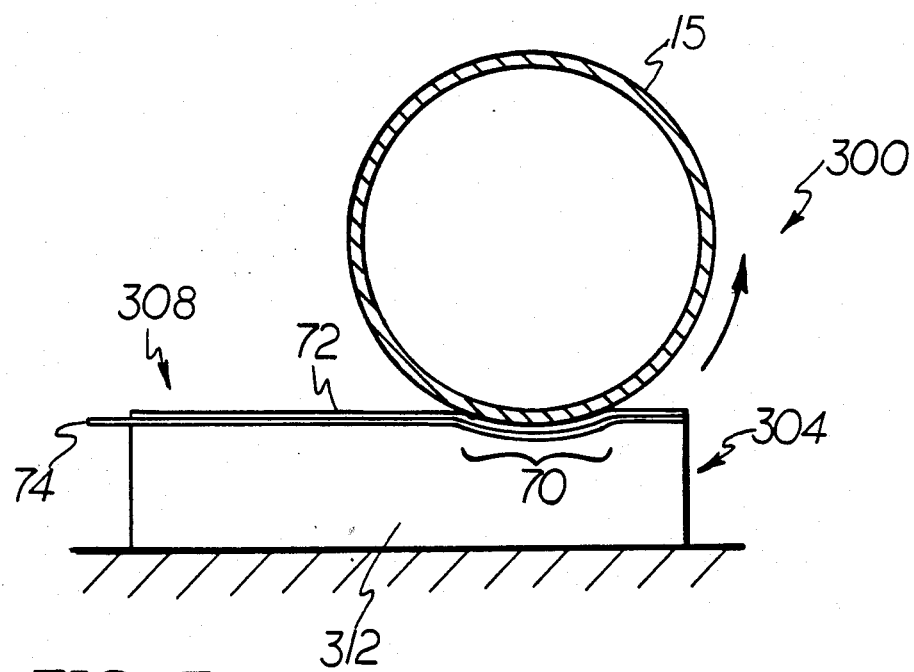
FIG. 7 is a top plan view of another embodiment of the capacitive probe within the wall thickness detector of FIG. 6 constructed in accordance with the present invention.

FIGS. 6 and 7 illustrate an inspection apparatus generally designated 300 including a wall thickness detector 302 and a capacitive probe 304. The inspection apparatus 300 is similar to the inspection apparatus 10 except as follows, and like reference numerals indicate like elements. The capacitive probe 304 is supported for horizontal, reciprocal movement by a plunger 18 mounted on the horizontally movable carriage 20. When the bottle 15 approaches the inspection site, originally the plunger 18 and the capacitive probe 304 are retracted so that the capacitive probe 304 does not engage the bottle 15. Then, when the bottle 15 reaches the inspection site, the plunger 18 is extended to urge the capacitive probe 304 against the sidewall of the bottle 15. This is the state of the wall thickness detector 302 illustrated in FIG. 7. In this state, the bottle 15 engages the region 70 of the capacitive element 304. Consequently, the bottle 15 does not drag against the capacitive probe 304 enroute to the inspection site.

The only other difference between the capacitive probe 304 and the capacitive probe 49 is that an end 308 of the capacitive probe 304 is not tapered; tapering is not necessary because of the fact that the bottle 15 does not rub against the capacitive probe 304 enroute to the inspection site. Consequently, in the capacitor probe 304 the flexible capacitive circuit board 74 is unchanged, and a support body 312 of the capacitive probe 304 is block-shaped without the tapered end present in the support body 80 of the capacitive probe 304.

At the inspection site, the bottle 15 is rotated and the plunger 18 and the capacitive probe 304 are moved linearly by the carriage 20 in synchronism with the conveyor 12 as in the inspection apparatus 10. After one or more complete rotations of the bottle 15, the plunger 18 is withdrawn to a position out of engagement with the bottle 15 and the bottle is free to continue along the conveyor 12 out of the inspection site.

By the foregoing, inspection apparatus and wall thickness detectors embodying the present invention have been disclosed. However, numerous modifications and substitutions may be made without deviating from the scope of the invention. For example, if desired, only two of the capacitive elements, 84 and 86, may be included in either of the capacitive probes 49 or 304 and provide an adequately defined electromagnetic field. In such a case, one of the capacitive elements is situated along one longitudinal edge of the capacitive probe and the other capacitive element is located along the other longitudinal edge of the probe.

Figure 8:
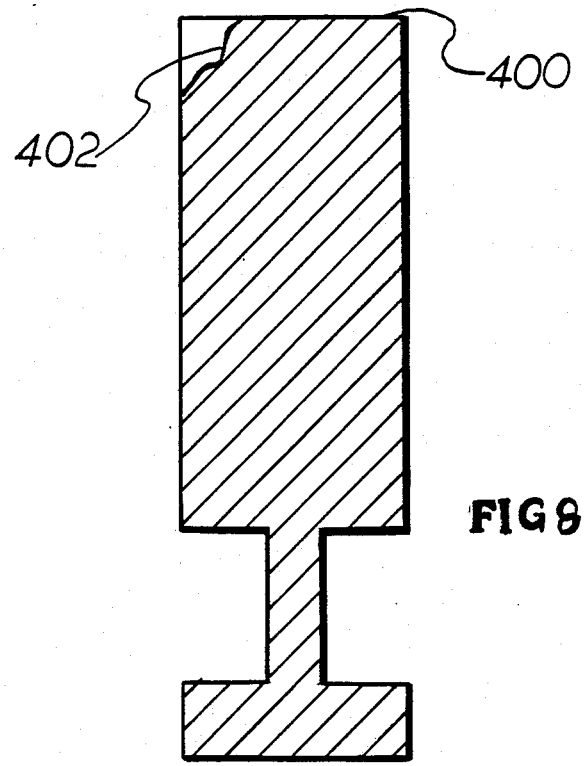
FIG. 8 is a plan view of a shield layer which may substitute for the shield layer of FIG. 4(C) to form another embodiment of the invention.

Also, it may be desirable to shield the back of shield layer 400 illustrated in FIG. 8 having a Teflon insulation layer 402 in place of the shield layer 380 to improve the flexibility of the circuit board. In such case, the backs of the other ground electrodes are unshielded and the front of all of the electrodes will still be framed by the shield layer 76 with the window 81 to expose the front of all of the electrodes to the bottle. Therefore, the invention has been disclosed by way of illustration and not limitation.

We claim:

1. A capacitive circuit laminate for a capacitive probe in a wall thickness detector, said capacitive circuit laminate comprising:

a middle layer including three elongated, equally spaced flexible metallic capacitive elements, means for applying a non-zero voltage waveform to the central of said capacitive elements, and means for shorting said other two outer capacitance elements to ground so that a capacitance field will be generated which is confined to a region approximately bounded by parallel planes through said outer capacitance elements and normal to said middle layer, a rear layer including a thin metallic shield for shielding the rear surface of said middle layer, and a front layer including a thin metallic shield for shielding the front surface of said middle layer and having a window for exposing a selected length of said capacitive elements of said middle layer whereby an electromagnetic field may emanate from said central one of said capacitive elements, pass outwardly through said window into the vicinity of a dielectric member, and return back through said window to said outer capacitive elements, and means for driving the thin metallic shields of said rear and front layers with said non-zero voltage waveform.

2. A capacitive circuit laminate as set forth in claim 1 wherein said rear layer further includes an insulating layer to insulate said metallic shield of said rear layer from said metallic flexible elements of said middle layer, and said front layer includes a thin insulating layer to insulate said metallic shield of said front layer from said metallic flexible elements of said middle layer.

3. A capacitive laminate as set forth in claim 1 wherein said metallic shield of said rear layer shields the rear surface of at least one of said capacitive elements.

4. A capacitive circuit laminate as set forth in claim 3 wherein said metallic shield of said rear layer shields the rear surface of each of said capacitive elements.

5. A capacitive circuit laminate according to claim 1 wherein window means is defined in said rear layer beneath said window in said front layer to reduce radiation from the rear layer to said capacitance elements.

* * * * *